United States Patent [19]

Morse

[11] Patent Number: 5,123,578
[45] Date of Patent: Jun. 23, 1992

[54] DUAL-PURPOSE FISHING ROD HOLSTER

[75] Inventor: Orville L. Morse, 3421 Topaz Ct., Redding, Calif. 96001

[73] Assignee: Orville L. Morse, Redding, Calif.

[21] Appl. No.: 673,773

[22] Filed: Mar. 21, 1991

[51] Int. Cl.⁵ .................................. A45F 4/00
[52] U.S. Cl. .......................... 224/151; 224/253; 224/249; 224/922; 43/21.2
[58] Field of Search ............. 224/922, 151, 253, 252, 224/224, 249; 43/21.2

[56] References Cited

U.S. PATENT DOCUMENTS

| | | | |
|---|---|---|---|
| 2,954,909 | 10/1960 | Miller et al. | 224/922 |
| 3,750,918 | 8/1973 | Jensen | 224/922 |
| 3,874,573 | 4/1975 | Fruscella et al. | |
| 4,569,466 | 2/1986 | Webber | 224/922 |
| 4,739,914 | 4/1988 | Pothetes | 224/922 |

Primary Examiner—Linda J. Sholl

[57] ABSTRACT

A holster for a fishing rod provides dual use in a one-piece belt-attach structure. During bank fishing and wade-in fishing, the holster fastens to a fisherman's belt on his right hand side and supports his fishing rod. The angle of the supported rod can be changed for baiting and to desired angles for fishing without removing the fishing rod from the holster. The disassembled rod is maintained vertically in a left hand position for hands free transporting. Reversible right and left hand versions of the holster are available.

4 Claims, 8 Drawing Sheets

DUAL-PURPOSE FISHING ROD HOLSTER

BACKGROUND OF THE INVENTION

1. Field of the Invention

This invention relates generally to a fishing rod holsters worn on a fisherman's belt for supporting a fishing rod during bank fishing or wade-in fishing. The present invention is particularly directed towards a dual-purpose holster. The first purpose is to hold an assembled fishing rod in an angled position for fishing with the holster attached on the right hand side of the fisherman's belt. The second purpose is to maintain a disassembled rod vertically on a fisherman's belt in a rearward left hand position during backpacking or simply while walking between fishing spots. Reversible right and left hand versions of the holster are available.

2. Description of the Prior Art

Although several types of belt-hung fishing rod supports are seen in past art patents, the single structure and versatility of the present invention is not found in the disclosures. Most of the studied devices were tubular or were fitted with hinging rings and hooks.

Patents examined which appeared most pertinent to the present invention include the following:

1. U.S. Pat. No. 3,874,573, issued Apr. 1, 1975, to Fruscella et al. A one-piece fishing rod holster fasteneable to a fisherman's belt is disclosed. Loops accepting the rod handle hold the rod in a substantially vertical position. The holster is single purpose and no mechanics for adjusting the angle of the rod are shown.

2. U.S. Pat. No. 4,569,466 illustrates a belt-worn fishing rod holster in which the rod is retained by pivotal metal rings or hooks. The patent, dated Feb. 11, 1986, was issued to Webber. The Webber holster has the single purpose of holding a fishing rod substantially right angled relative to the fisherman. His holster does not lend itself for a secondary application or for adjusting the use angle of the rod.

3. In U.S. Pat. No. 4,739,914, the inventor, Pothetes, uses a double jaw type rest for a fishing rod in a belt-attached holder. The angle of the rod can be adjusted by releasing and tightening a thumb screw which holds the jaw members attached to the belt. Adjusting would appear somewhat unhandy as the thumb screw also tightens the jaws down on the rod handle. A fisherman would have to be very careful not to release and drop his rod while adjusting the rod angle. The patent is dated Apr. 26, 1988.

All devices designated fishing rod holders or fishing rod holsters seen in a past art search appeared to have the single purpose of supporting a fishing rod or a fly rod angled out for fishing from a belt attachment. Adjustments for repositioning the rod angle, if offered at all, were not easily accomplished. A holder having a secondary purpose for use in transporting a disassembled fishing rod was not seen.

SUMMARY OF THE INVENTION

Therefore, in practicing my invention, I provide a fishing rod holster which allows easy adjustment of rod angle for fishing and doubles as a dissembled rod carrier when a fisherman backpacks or simply walks to a different fishing spot. The invention is a one-piece structure having one wide side and one narrow side with spaced cross supports between them. A fishing rod butt receiver end of the holster has two of the cross supports with an opening between them sized to accept and hold the butt end of a fishing rod passed through the opening. The rod butt receiver end is referred to as the rear of the holster. The narrow side of the holster is shaped like an elongated opened U with one short leg. The U opening allows different sized reels to fit into the holster with cranks or even some portions of the reel protruding from the holster narrow side. A cross piece closes off the end between the short leg of the U and the wide holster side. This end is referred to as the front of the holster. The front holster cross piece has a large and a small round opening cut through it. The large opening in the holster front end is accessible through the top. The two openings merge with the small opening being accessible through one side of the large opening. Two other cross members forward of the base of the U between the narrow side and the wide side of the holster provide support and partly cover the bottom of the holster. Behind the partly covered bottom, an angled section of the holster is open towards the holster rear end. There is also an angled section open just below the frontal cross piece. The wide side of the holster has two belt slots aligned in a manner to tilt the holster with the front end upward when a belt is attached to the holster and being worn by a fisherman. The two round openings in the front end of the holster are for supporting different sections of the fishing rod shaft for different purposes. The large opening accepts and supports the pole shaft for fishing and for transport of the dissembled pole. The small opening accepts the blade section of the pole when the pole is disassembled and two sections of the pole are placed side by side during transport. With the holster on the fisherman's belt at his right hand side and the fishing pole positioned in the holster, a variety of pole angles are available to the fisherman. For bottom or bobber fishing the pole rod can be placed down in the circular opening at a low fishing angle or set atop the front plate for a high fishing angle. For baiting or for fish-on action, the pole can be elevated almost vertically with the pole butt protruding downward through the open bottom of the holster. As the narrow side and the top of the holster are substantially open, the fishing rod is easily removed from the holster simply by lifting the shaft of the rod and pulling the rod forward. For fishing rods with elongated butts or for fly fishing rods, the butt of the pole can be retained through the opening in the rear of the holster with the reel ahead of the front holster end cross piece.

For backpacking or simply for waling from one fishing spot to another, the holster of this invention can be removed from the belt, positioned on the opposite side of the fisherman towards his back with the belt passed through the angled opening adjacent the front cross piece of the holster. In this position, the holster is behind the fisherman's shoulder in a substantially vertical position. The disassembled fishing rod can then be carried out-of-the-way in a near vertical position. The rod butt is passed through and retained by the butt retaining cross pieces in the rear of the holster, the shaft of the rod is in the large round opening in the holster front cross piece, and the rod blade, temporarily attached to the rod shaft by a tie, fits into the small round hole in the holster front end.

Therefore, a principal object of the present invention is to provide a fishing rod holster for a fisherman to wear on his belt, the holster having the dual purpose of holding a fishing rod angled for fishing and maintainging a disassembled fishing rod vertically for transporting.

A further object of this invention is to provide a fishing rod holster to be worn on the belt of a fisherman, the holster being one-pice having features allowing adjustable angling of the rod shaft without requiring manual locking or unlocking of machine mechanics.

A still further object of the invention is to provide a fishing rod holster to be worn on a fisherman's belt, the holster being structured to accept and retain a variety of fishing rod and fly rod types.

Another object of the present invention is to provide a fishing rod holster to be worn on a fisherman's belt, the holster being in one-pice form which can be manufactured from a variety of materials including leather and plastic.

Other objects and the many advantages of the present invention will become clear from reading the specification and comparing numerically designated parts described relative to the same numbered parts illustrated in the drawings.

DESCRIPTION OF THE PREFERRED EMBODIMENTS

Figure 1:
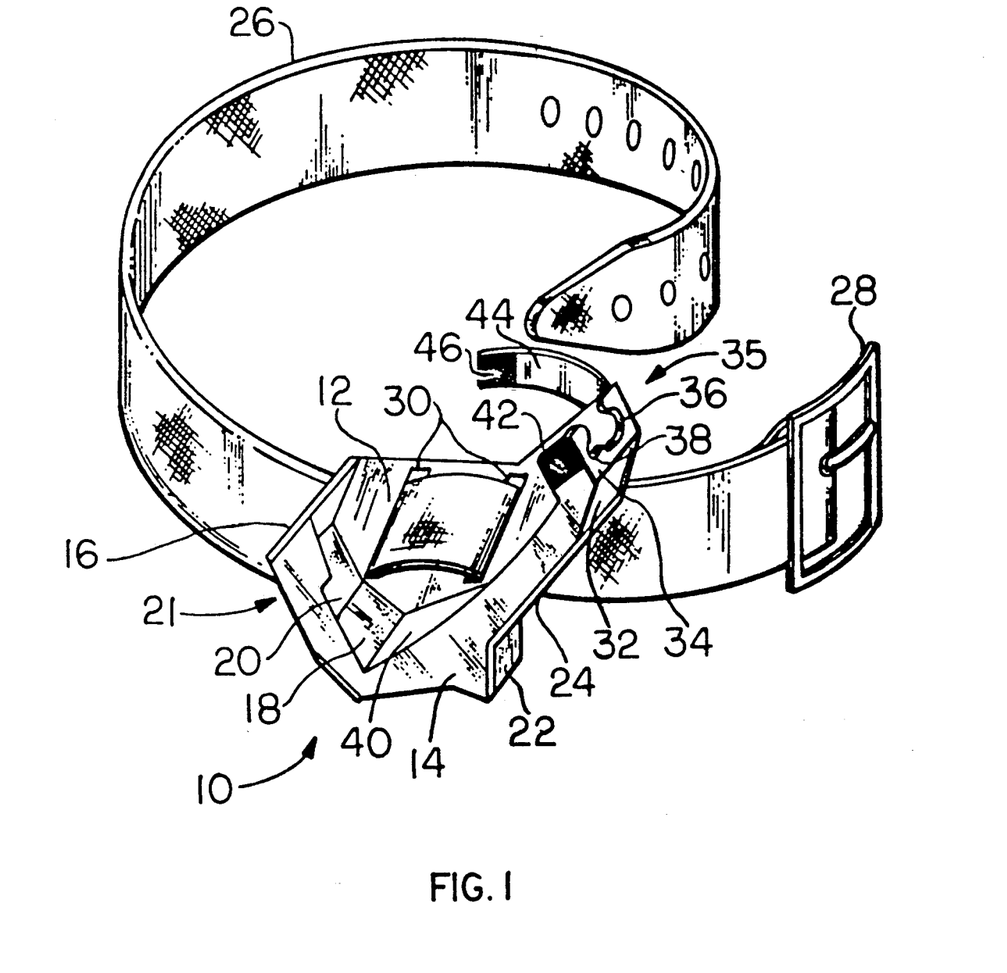
FIG. 1 is a perspective drawing illustrating the single structure of the invention attached to a belt.
Figure 2:
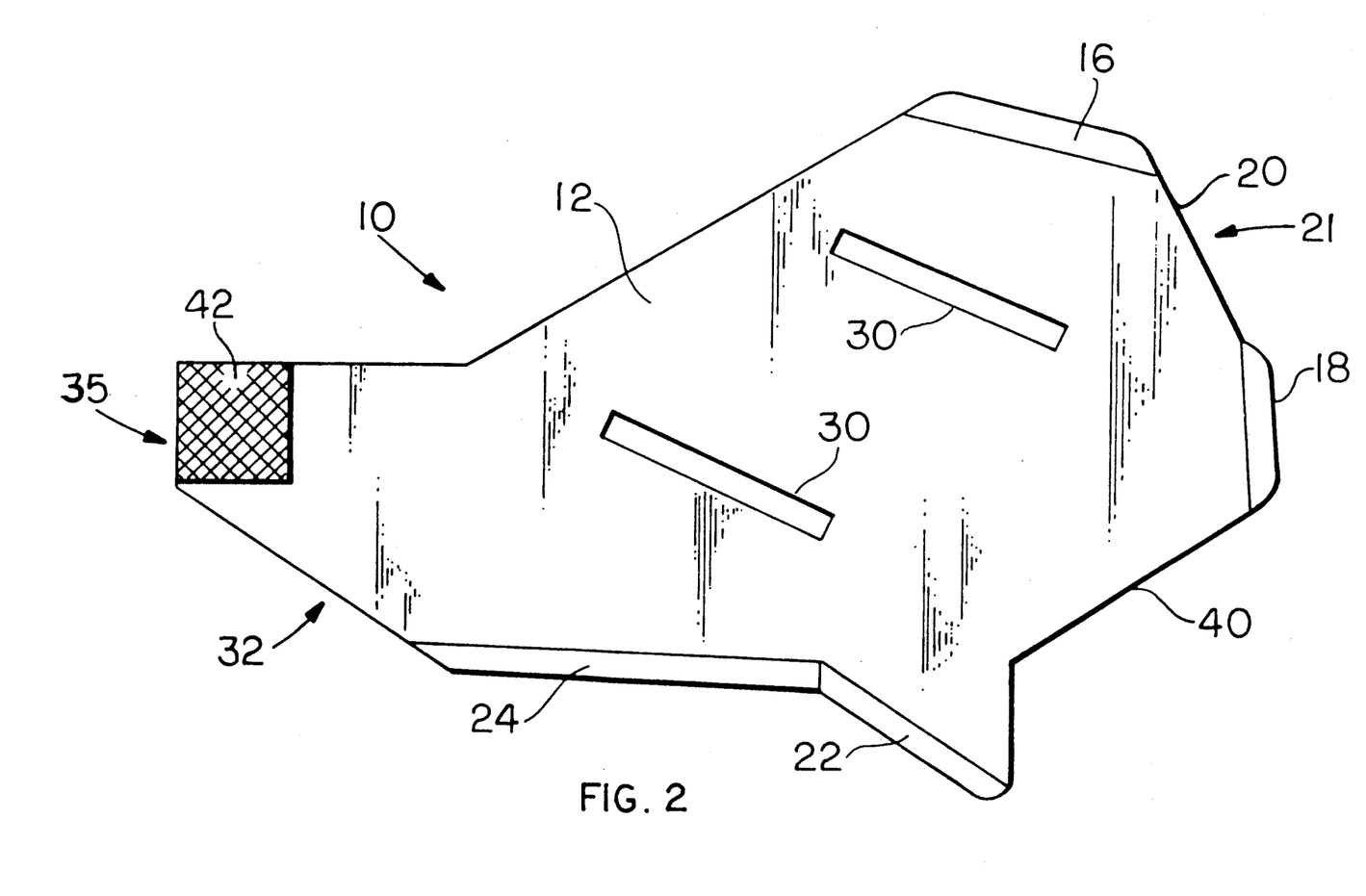
FIG. 2 is a side view of the holster from the wide side showing the belt slots.
Figure 3:
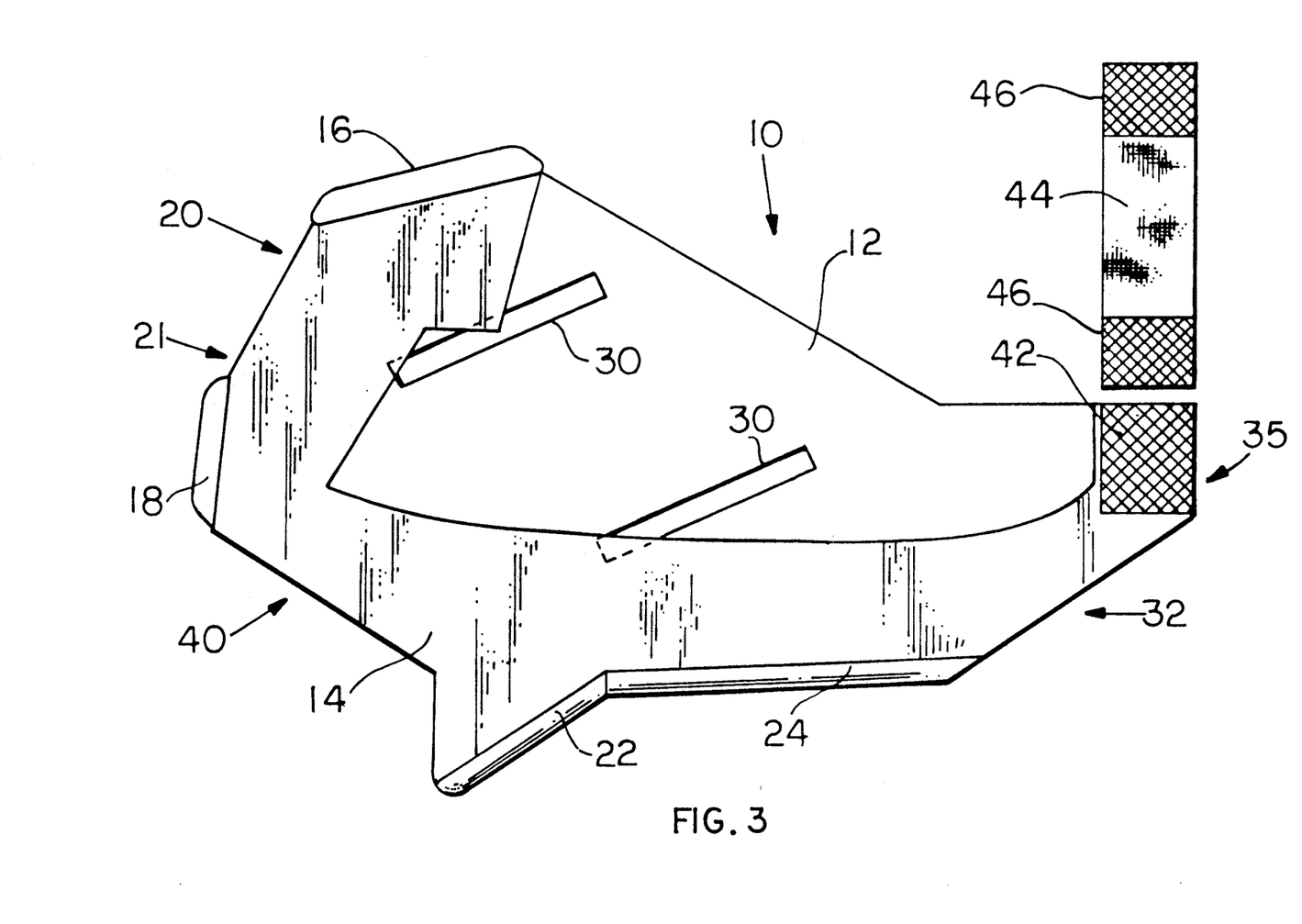
FIG. 3 is a side view of the holster from the narrow side.
Figure 4:
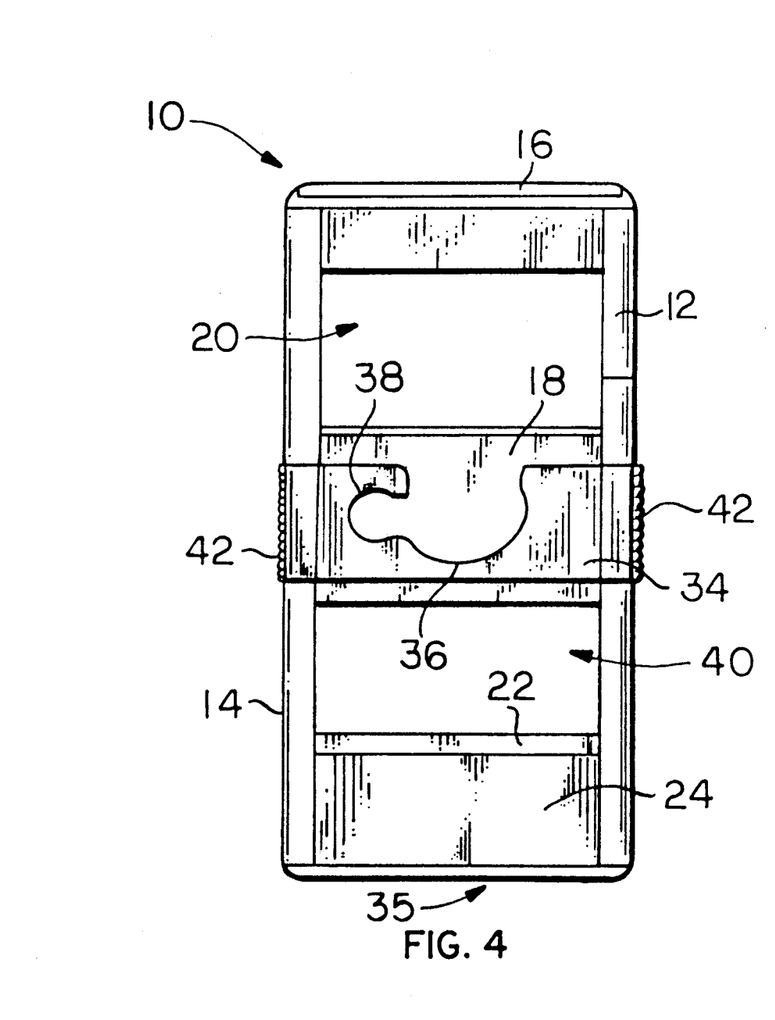
FIG. 4 is a frontal view of the single-piece holder structure showing the large and small rod support circular openings.
Figure 5:
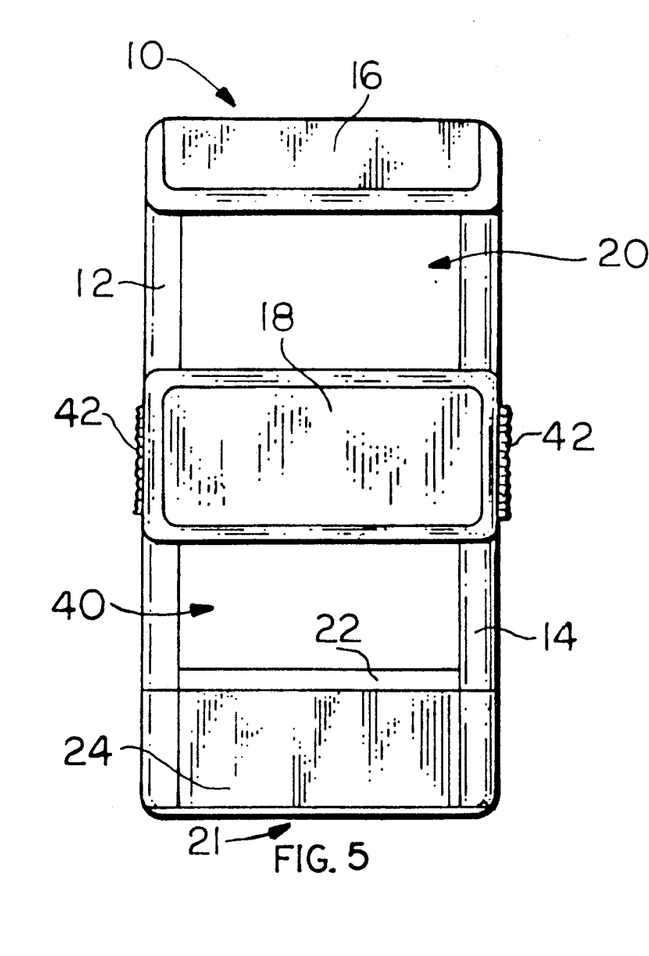
FIG. 5 is a rear view of the holster showing the cross pieces and floor which support the butt of the fishing rod.
Figure 6:
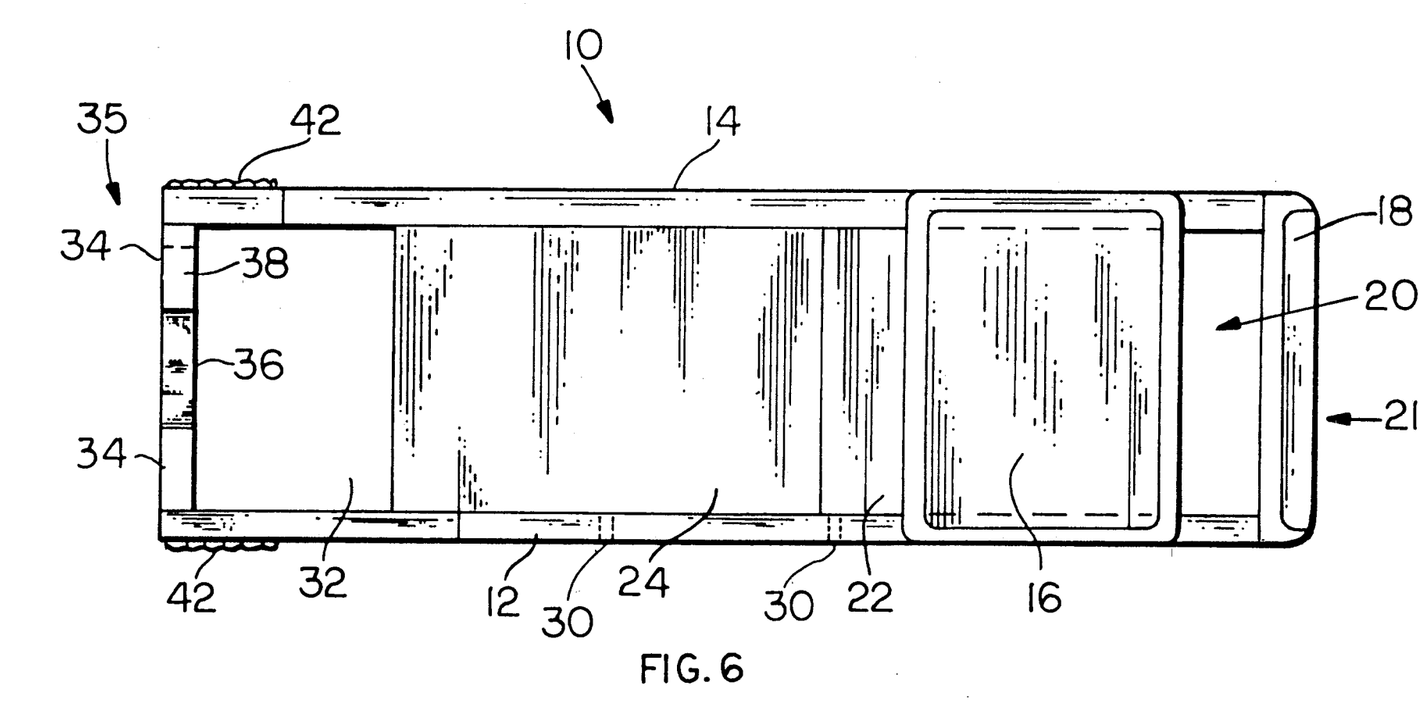
FIG. 6 is a top plan view of the holster according to the invention.
Figure 7:
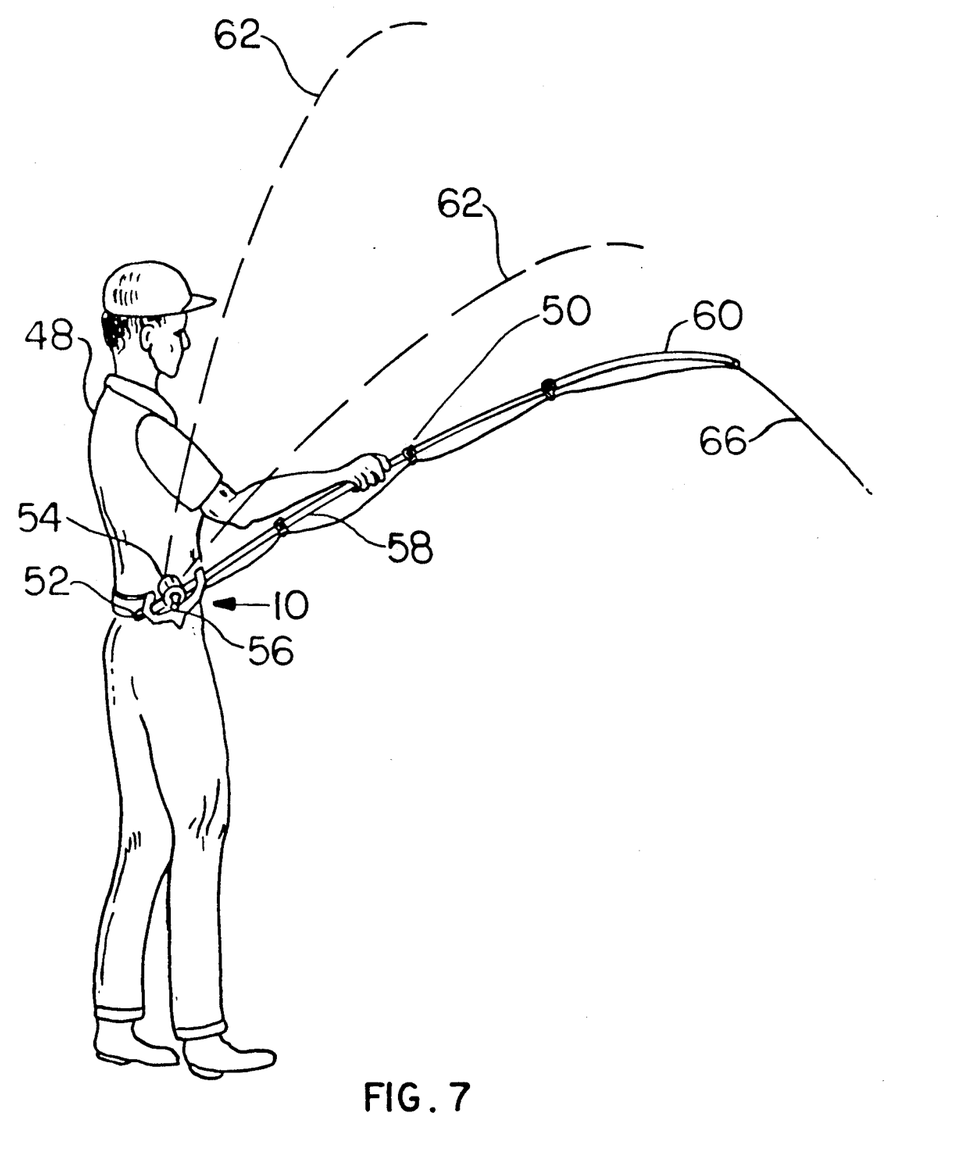
FIG. 7 shows a fisherman using the holster. A first dotted line shown an elevated positions in which the rod can be set and a second dotted line illustrates the rod raised to almost a vertical position.
Figure 8:
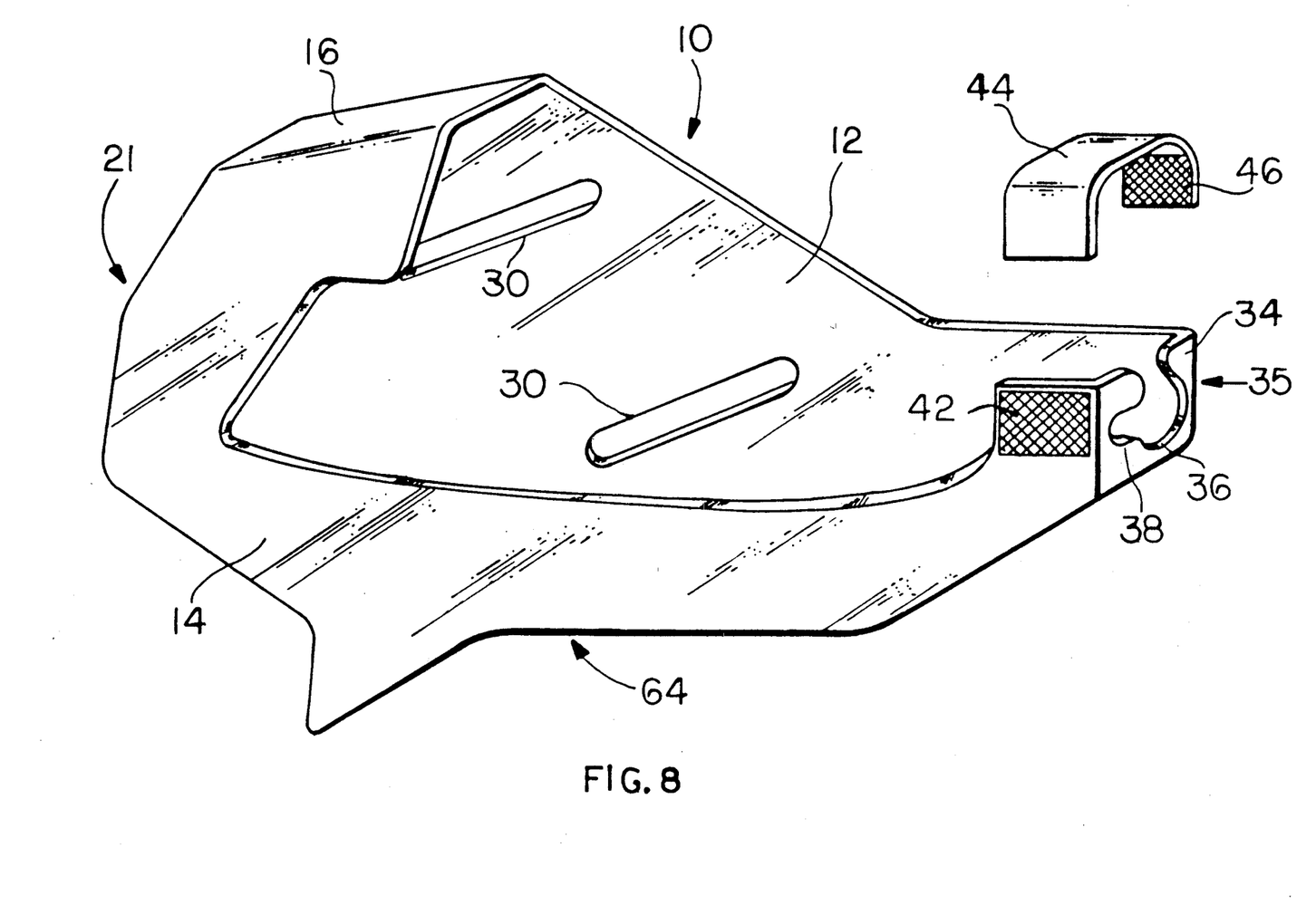
FIG. 8 shows a plastic structured embodiment of the invention.
Figure 9:
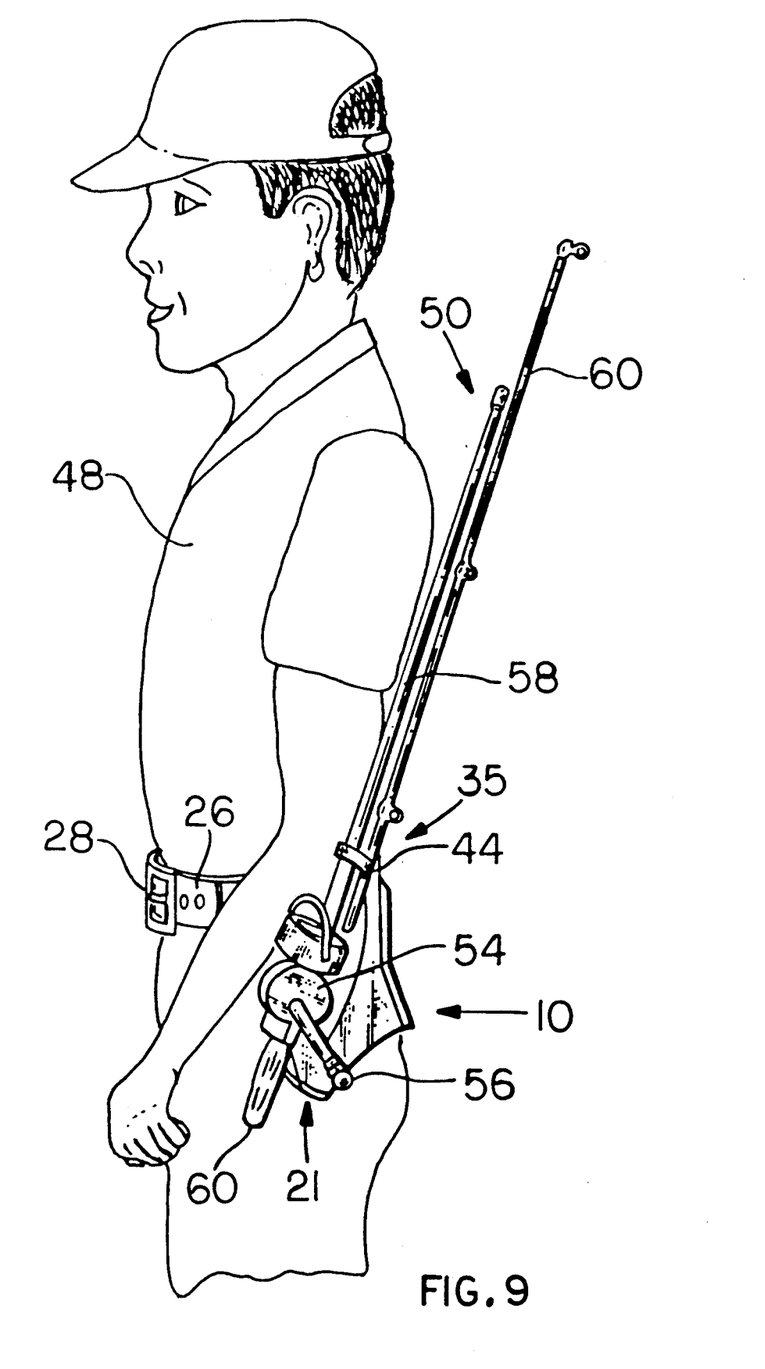
FIG. 9 illustrates the holster with the fisherman's belt run through the opening at the top of the holster. The holster is on the left hand side of the fisherman and the disassembled fishing rod is in a near vertical position in the holster to the rear of the fisherman's body for out-of-the-way portage.

Referring now to the drawings at FIG. 1 where dual-purpose fishing rod holster 10, according to the invention, is illustrated in a prospective view. Holster 10 is a one-piece structure having one wide side 12, somewhat shoe shaped, and one narrow side 14, opened like an elongated U with one shortened leg. Sides 12 and 14 are positioned side by side maintained by spaced cross supports panels in a manner to provide holster 10 with a designated rear end 21 and a designated front end 35. At rear end 21, the supporting cross panels include upper rear panel 16 at the top as shown in FIG. 1 and lower rear panel 18 crossing a lower angled section at rear end 21 fo holster 10. An opening between panel 16 and panel 18 provides rod handle slot 20 through which a fishing rod handle butt 52, see FIG. 7 or FIG. 9, may pass and be retained. At front end 35 of holster 10, front panel 34 closes off the end between the short leg of the U on narrow side 14 and wide side 12 of holster 10. Front panel 34 has a large round opening, rod shaft receiver opening 36, and a small opening, rod blade receiver opening 38, cut through it. Rod shaft receiver opening 36 is accessible through the opened top. The two openings, 36 and 38 merge with the small opening, rod blade receiver opening 38, being accessible only through one side of rod shaft receiver opening 36, the larger opening. Two other cross members, first base panel 22 and second base panel 24, forward of the base of the U between narrow side 14 and wide side 12 provide support and partly cover the bottom of holster 10 toward holster front 35. Behind the partly covered bottom, an angled section of holster 10 is open towards holster rear end 21. This is holster base opening 40 which will also accept rod handle butt 52 when fishing rod 50 is angled upward, angles 62, during fishing. This is illustrated in FIG. 7. First base panel 22 and second base panel 24 abut and cover holster 10 from the holster base opening 40 to a second opening, alternate carrier belt opening 32, which is an angled opening between the forward edge of second base panel 24 and the lower edge of front panel 34. Alternate carrier belt opening 32 is also an opened angled section through which belt 26 can be passed for left hand use of the holster 10 as a carrier. For wearing holster 10 during fishing use, wide side 12 has two belt slots 30 aligned in a manner to tilt holster 10 with the front end 35 upward when holster 10 is attached to belt 26. Belt 26 is worn around the waist of fisherman 48 buckled by belt buckle 28. Rounded openings, rod shaft receiver opening 36 and rod blade receiver opening 38, previously noted, in front panel 34 of holster 10 are for supporting different sections of the shafts of fishing rod 50 for different purposes. The large opening, rod shaft receiver opening 36, accepts and supports rod shaft 58 for fishing and for transporting dissembled fishing rod 50. The small opening, rod blade receiver opening 38 accepts rod blade 60 of fishing rod 50 when disassembled for transporting. Rod shaft 58 and rod blade 60 are placed side by side in shaft receiver hole 36 and blade receiver hole 38 respectively during transporting. The two sections are usually temporarily tied together.

With holster 10 on belt 26 of fisherman 48 at his right hand side and fishing rod 50 positioned in the holster, a variety of pole angles 62 are available to the fisherman. For bottom or bobber fishing, rod shaft 58 of rod 50 can be placed down in rod shaft receiver opening 36 for a low fishing angle. For a higher angle 62, rod shaft 58 can be set atop front plate 34 for a high fishing angle. See FIG. 7. For baiting or for fish-on action, the entire fishing rod 50 can be elevated almost vertically with rod handle butt 52 protruding downward through holster base opening 40. As narrow side 14 and the top of holster 10 is substantially open, fishing rod 50 is easily removed from holster 10 simply by lifting fishing rod shaft 58 out of rod shaft receiver opening 36 and pulling fishing rod 50 forward. Fishing line 66 can be cast out and fishing rod 50 secured in holster 10 as shown in FIG. 7, for fishing. For placing fishing rod 50 into holster 10 for fishing, rod handle butt 52 is positioned in line with rod handle slot 20. Fishing rod 50 is slid back and down into holster 10. Rod shaft 58 is aligned to drop into rod shaft receiver opening 36. This rests reel 54 in the U opening of narrow side 14 with reel crank 56 protruding out through the U opening. For a fishing rod 50 with an elongated butt 52 and for fly fishing rods, butt 52 can be retained through the opening of rod handle slot 20 in rear 21 of holster 10 with reel 54 ahead of end cross piece 34 at the front 35 of holster 10.

For backpacking or simply for walking from one fishing spot to another, holster 10 can be removed from belt 26, positioned on the opposite side, the left hand side, of fisherman 48 towards his back and used as a disassembled fishing rod 50 carrier. For this use, belt 26 is passed through alternate carrier belt opening 32, the angled opening adjacent front cross piece 34. In this position, holster 10 is towards the back of fisherman 48 in a substantially vertical position. See FIG. 9. Disassembled fishing rod 50 can then be carried out-of-the-way in a near vertical position. Rod butt 52 is passed through rod handle slot 20 and retained by butt retaining cross pieces 16 and 18 in the rear 21 of holster 10. Shaft 58 of fishing rod 50 is in the large round opening, rod shaft receiver opening 36, in holster front cross piece 34. Rod blade 60, temporarily tied to rod shaft 58, fits into the small round hole, rod blade receiver opening 38. Holster front end 35 is facing upward for this use. Fitting across the top of front section 34, is double ended rod shaft retainer strip 44, a removable strip held by hook and loop fasteners. As illustrated in the drawings, hook lock pads 42 are on the outside surfaces of wide side 12 and narrow side 14 towards front end 35 of holster 10. Loop lock pads 46 are on the inside surfaces of retainer strip 44 to match loop lock pads 46 for temporary adhesion with holster 10. Hook pad 42 or loop pad 46 could be on either the holster 10 walls or the strip 44 so long as a match up for temporary attachment is obtained. Double ended rod shaft retainer strip 44 fastens around and over rod shaft 58 and rod blade 60 holding them secure during times when holster 10 is being used for transporting disassembled fishing rod 50. From the forgoing, it can be seen that the dual purpose of the present invention, holster 10 is: (1) A belt-attached fishing rod 50 holster 10 for use by fisherman 48 while fishing. For this purpose holster 10 is fastened on the right hand side of fisherman 48 in a substantially horizontal position. (2) In a opposite side attachment, holster 10 is turned on end and used as a carrier for a disassembled fishing rod 50. For this use, rod shaft receiver opening 36 and rod blade receiver opening 38 align with holster base opening 40 and these openings are sized to require snap-in insertion of fishing rod shaft 58 and rod blade 60. Right and left hand versins of holster 10 can be readily fabricated.

Although I have described embodiments of my invention with considerable detail in the foregoing specification and have illustrated them extensively in the drawings, it is to be understood that I may practice variations in the invention which do not exceed the scope of the appended claims. Also, any variations of my invention practiced by others which fall within the scope of my claims, I shall consider to be my invention.

What is claimed is:

1. A dual purpose fishing rod holster attachable to a belt worn by a fisherman in two different positions, said fishing rod holster having a first position with said belt to support a fishing rod in various fishing positions and a second position on said belt for transporting said fishing rod in a near vertical position, said holster comprising:
   a. a wide side portion and a narrow side portion; said wide side portion and said narrow side portion being parallel and connected to each other by a designated front end cross panel, a designated rear end cross panel and a designated bottom cross panel forming a cradle for a fishing rod reel on said fishing rod;
   b. said rear end cross panel and said bottom cross panel being spaced apart to form an opening sized to accept passage of a fishing rod handle butt;
   c. slot means in said wide side portion for attaching said holster to said belt in said first position such that the fishing rod is maintained in a generally horizontal inuse position;
   d. a secondary belt passage opening formed between said front end cross panel and said bottom cross panel for securing said belt in said second position such that the fishing rod is maintained in a generally vertical transporting position;
   e. a first opening and a second opening in said front end cross panel, said first opening sized to accept and maintain a fishing rod shaft during fishing use and transport, said second opening sized for holding a rod blade in transport when disassembled from said rod shaft while said fishing rod shaft is maintained in said first opening;
   f. means for temporarily securing said fishing rod shaft in said first opening and said rod blade in said second opening.

2. The holster of claim 1 wherein said means for temporarily securing said fishing rod shaft in said first opening and said fishing rod blade in said second opening includes access openings to said first and said second openings being of a size requiring snap-in insertion of said fishing rod shaft and fishing rod blade.

3. The holster of claim 1 wherein said means for temporarily securing said fishing rod shaft in said first opening and said fishing rod blade in said second opening includes said second opening being only accessible from said first opening and said fishing rod shaft obstructing removal of said fishing rod blade.

4. The holster of claim 1 wherein said means for temporarily securing said fishing rod shaft in said first opening and said fishing rod blade in said second opening includes a removable strip attachable over the access openings of said first opening and said second opening.

* * * * *